(12) United States Patent
Inoue et al.

(10) Patent No.: US 9,216,694 B2
(45) Date of Patent: Dec. 22, 2015

(54) VEHICLE CENTER CONSOLE

(71) Applicant: HONDA MOTOR CO., LTD., Tokyo (JP)

(72) Inventors: Kei Inoue, Wako (JP); Masamitsu Shiono, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/522,004

(22) Filed: Oct. 23, 2014

(65) Prior Publication Data

US 2015/0115641 A1 Apr. 30, 2015

(30) Foreign Application Priority Data

Oct. 29, 2013 (JP) ................................. 2013-223911

(51) Int. Cl.
*B60R 7/00* (2006.01)
*B60R 7/04* (2006.01)
*B60N 2/46* (2006.01)

(52) U.S. Cl.
CPC ................ *B60R 7/04* (2013.01); *B60N 2/4626* (2013.01); *B60N 2/4686* (2013.01)

(58) Field of Classification Search
CPC ...... B60R 7/04; B60N 2/4626; B60N 2/4686; B60N 11/00
See application file for complete search history.

(56) References Cited

U.S. PATENT DOCUMENTS

2009/0072568 A1* 3/2009 Luginbill et al. ............ 296/37.8
2010/0045060 A1* 2/2010 Hipshier .................... 296/24.34

FOREIGN PATENT DOCUMENTS

JP 2008-189170 8/2008
JP 2012-187956 10/2012

OTHER PUBLICATIONS

Japanese Office Action with partial English Translation dated Jul. 7, 2015, 5 pages.

* cited by examiner

*Primary Examiner* — Lori L Lyjak
(74) *Attorney, Agent, or Firm* — Rankin, Hill & Clark LLP

(57) ABSTRACT

A vehicle center console includes a small item receptacle closing a part of an opening of a console body and capable of storing therein small items, and an arm rest closing a remaining part of the opening of the console body and capable of placing thereon an elbow of a passenger. The small item receptacle and the arm rest are mounted adjacent to each other on the console body in such a manner that the small item receptacle and the arm rest are slidable in a front-rear direction of the vehicle. The vehicle center console has an opening mode for opening the opening of the console body by sliding the small item rearwardly so that both the small item and the arm rest are together slid rearwardly.

5 Claims, 14 Drawing Sheets

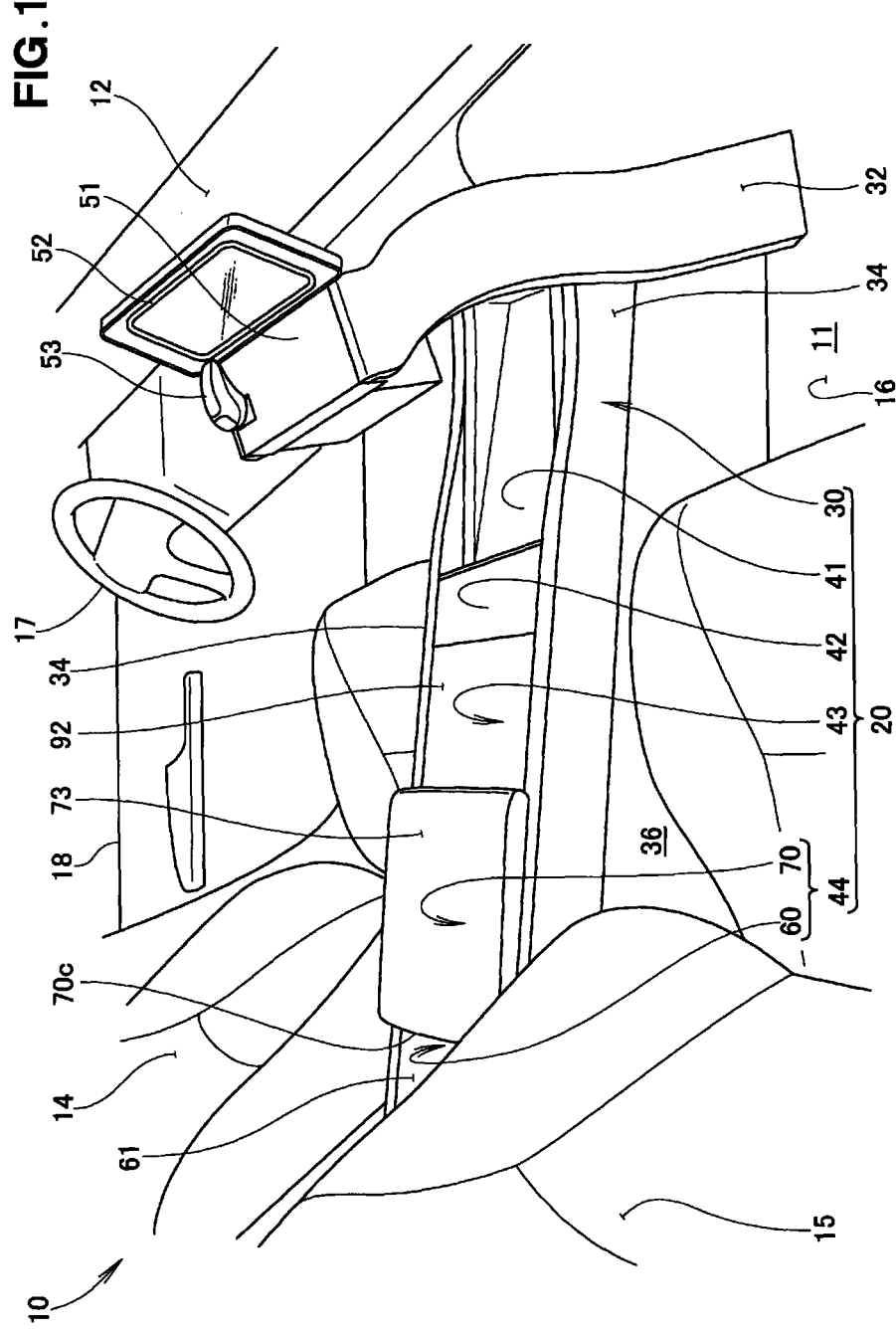

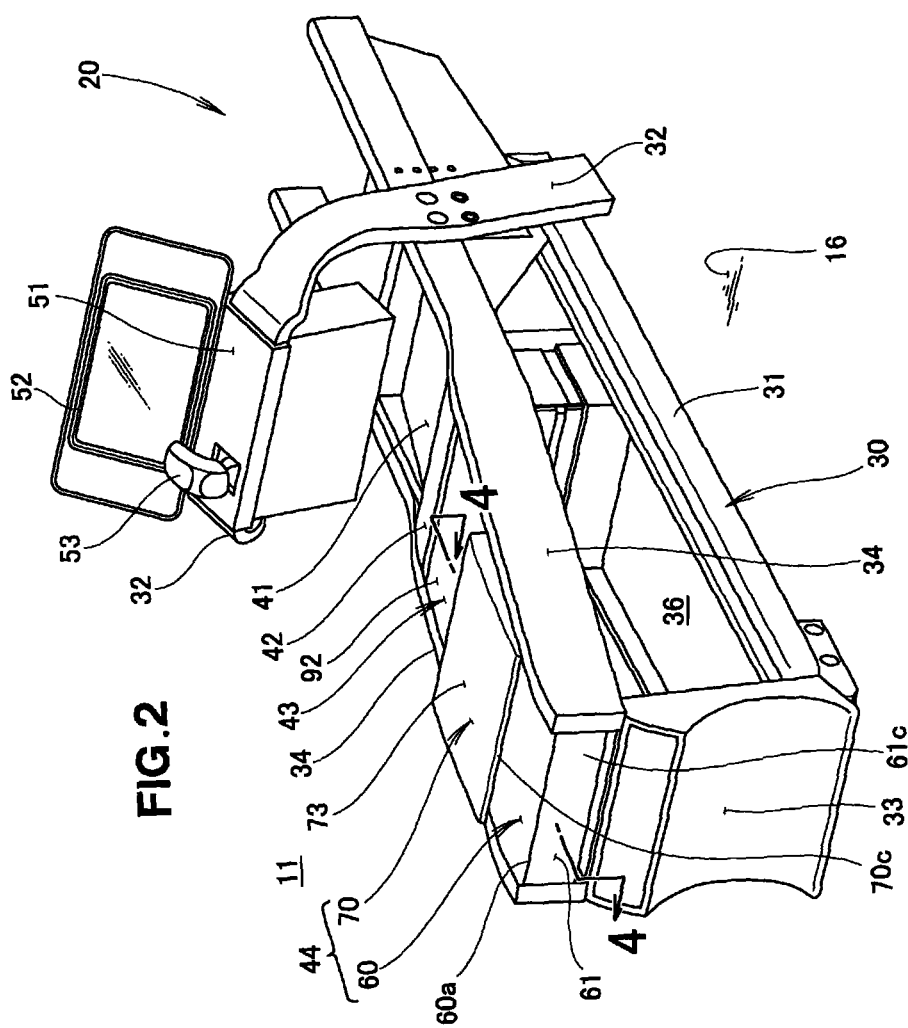

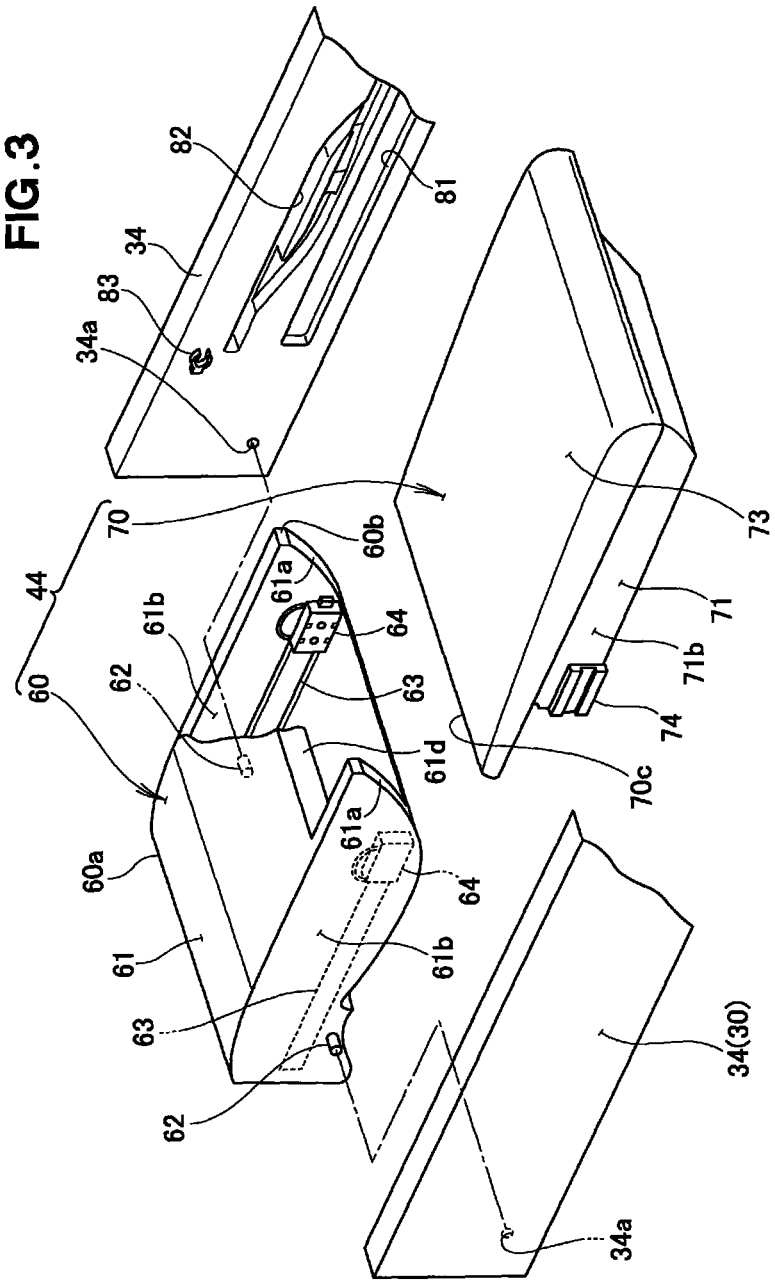

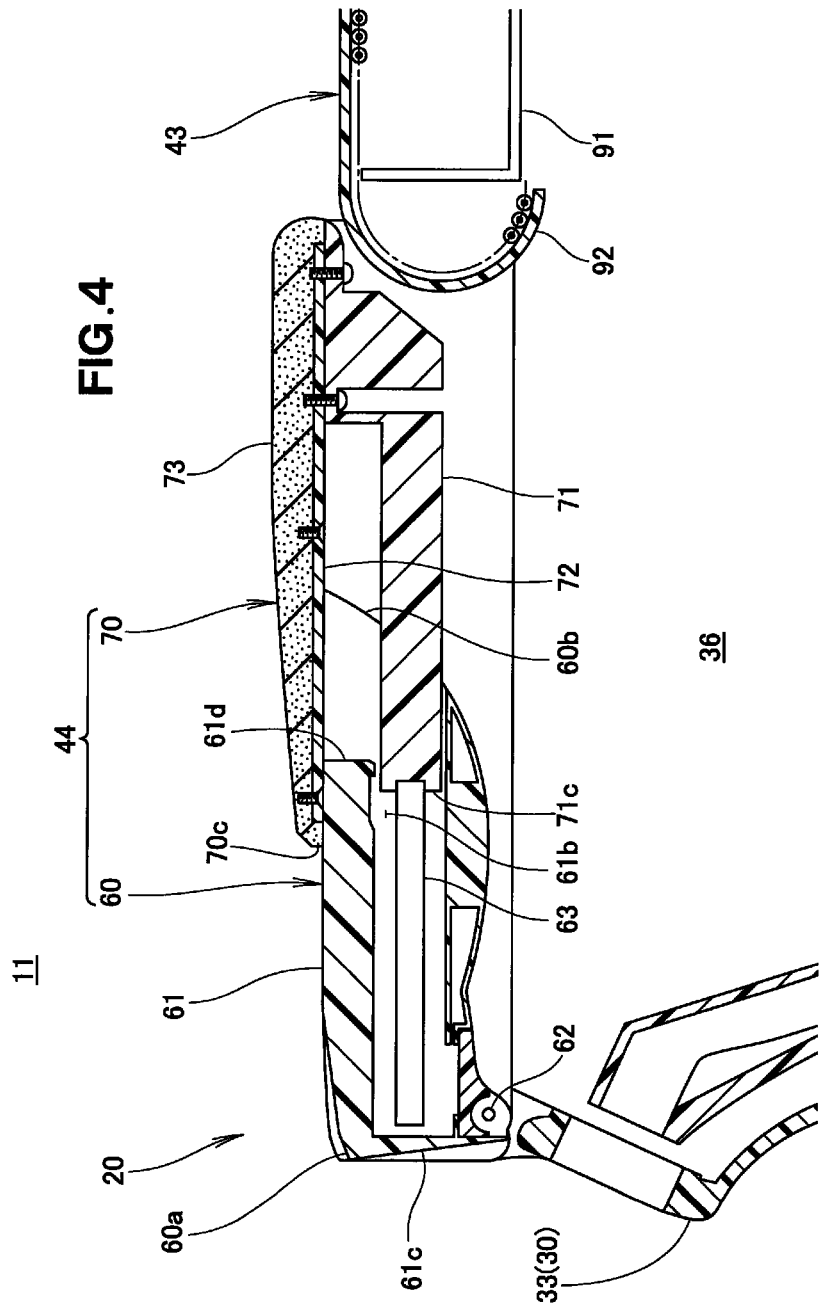

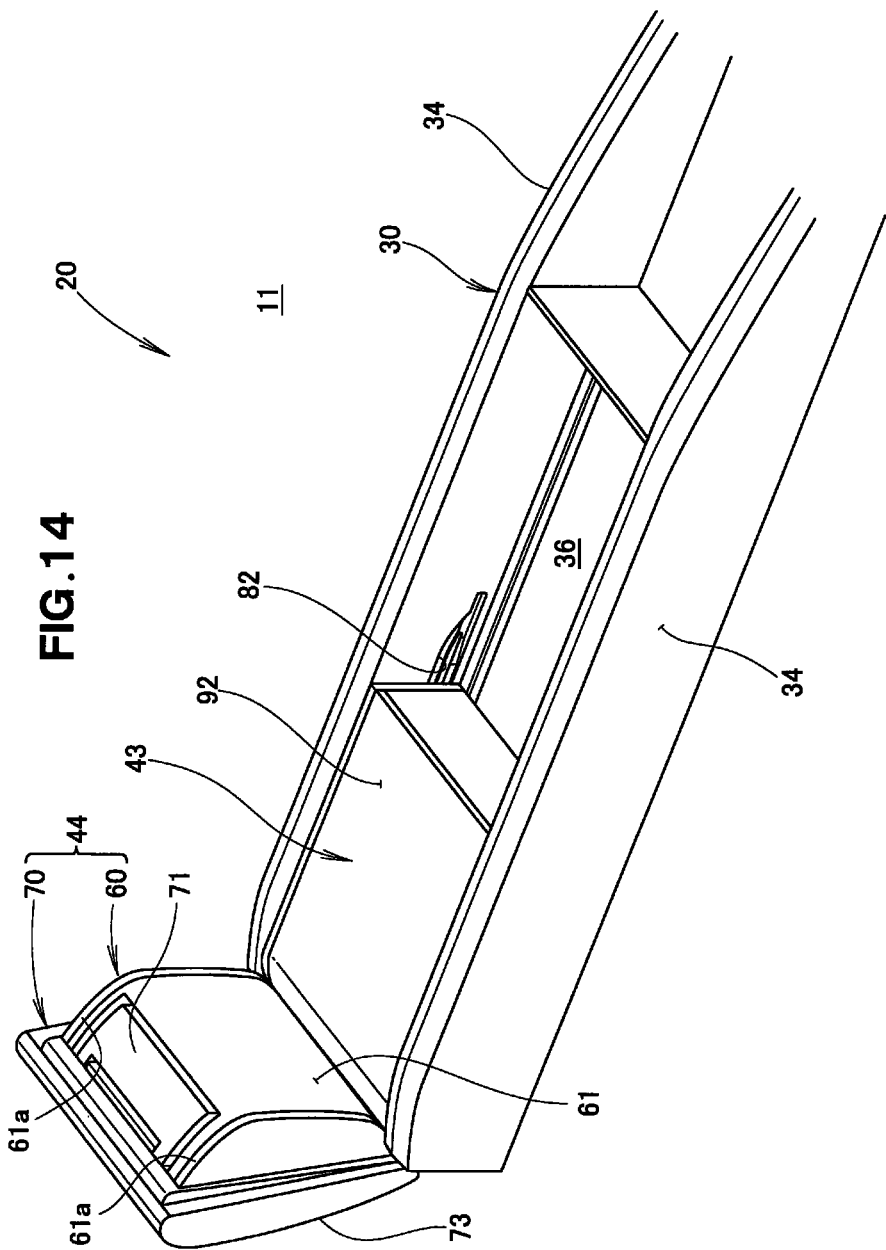

VEHICLE CENTER CONSOLE

FIELD OF THE INVENTION

The present invention relates to vehicle center consoles having a small item receptacle mounted on a console body.

BACKGROUND OF THE INVENTION

In many vehicles, a vehicle console is disposed between left and right seats. In some of the vehicle consoles known today, a small item receptacle for a passenger to store small items is mounted on a console body. One example of the conventional techniques relating to such vehicle center consoles is disclosed in Japanese Patent Application Laid-open Publication No. 2008-189170 (hereinafter referred to as "Patent Literature 1").

In the vehicle center console disclosed in Patent Literature 1, the console body capable of storing passenger's baggage is disposed between the left and right seats, and the small item receptacle is mounted on an upper portion of the console body in such a manner that it is slidable in a front-rear direction of the vehicle. With the small item receptacle slid to a forward position, baggage can be stored into an interior portion of the console body rearward of the small item receptacle. With the small item receptacle slid to a rearward position, on the other hand, baggage can be stored into an interior portion of the console body forward of the small item receptacle. Thus, many pieces of baggage can be stored in the entire interior of the console body.

However, because the console body is always open at a portion forward or rearward of the small item receptacle, there is a possibility of a small item accidentally falling into the interior of the console body, and thus, the vehicle center console disclosed in Patent Literature 1 has a room for further improvement.

SUMMARY OF THE INVENTION

In view of the foregoing prior art problems, it is an object of the present invention to provide an improved vehicle center console which can reliably prevent a small item from undesirably falling down into the interior of the console body.

In order to accomplish the above-mentioned object, the present invention provides an improved vehicle center console, which comprises: a console body disposed between left and right seats of a vehicle, the console body having an upward opening and capable of storing therein baggage; a small item receptacle closing a part of the opening of the console body and capable of storing therein a small item; and an arm rest closing the remaining part of the opening of the console body and capable of placing thereon an elbow of a passenger, the arm rest being disposed rearwardly of the small item receptacle, the small item receptacle and the arm rest being mounted adjacent to each other on the console body in such a manner that the small item receptacle and the arm rest are slidable in a front-rear direction. For opening the opening of the console body, the vehicle center console having: a first opening mode for opening the opening of the console body by sliding the arm rest rearwardly; and a second opening mode for opening the opening of the console body by sliding the small item receptacle rearwardly to thereby slide both the small item receptacle and the arm rest together rearwardly.

According to the present invention, the small item receptacle and the arm rest are mounted adjacent to each other on the console body in such a manner that the small item receptacle and the arm rest are slidable in the front-rear direction of the vehicle. For opening the opening of the console body, the vehicle center console has, or can operate in: the first opening mode for opening the opening of the console body by sliding the arm rest rearwardly; and the second opening mode for opening the opening of the console body by sliding the small item receptacle rearwardly to thereby slide both the small item receptacle and the arm rest together rearwardly. When baggage is to be stored into a storage portion beneath the arm rest in a closed state, only the arm rest is slid rearwardly in the first opening mode, and then, after storage of the baggage beneath the arm rest, the arm rest is slid back forwardly to close the opening of the console body. When baggage is to be stored into a storage portion beneath the small item receptacle in the closed state, on the other hand, the small item receptacle and the arm rest are slid rearwardly together in the second opening mode, and, after storage of the baggage beneath the small item receptacle, the small item receptacle and the arm rest are slid back forwardly to close the opening of the console body. Namely, because baggage can be stored beneath both the small item receptacle and the arm rest, an increased number of pieces of baggage can be readily stored in a lower portion (i.e., again storage section) of the console body. Further, because the opening of the console is closed after storage of the baggage, small items stored in the small item receptacle can be reliably prevented from falling down into the console body. As a result, the vehicle center console of the present invention can reliably prevent the small items from falling down into the console body while being capable of storing an increased number of pieces of baggage.

In addition, because the small item receptacle and the arm rest are mounted adjacent to each other for sliding movement in the front-rear direction of the vehicle, the arm rest too can be slid rearwardly in response to the rearward sliding movement of the small item receptacle in the second opening mode. Namely, the small item receptacle and the arm rest can be slid with a single operation, and thus, the present invention can achieve an enhanced operability.

Preferably, the arm rest includes a base section mounted on the console body, and a slide section slidably mounted on the base section and having a front end portion capable of contacting the small item receptacle. The slide section is slid rearwardly by the small item receptacle being slid rearwardly, and a limit of rearward movement of the slide section is defined by the base section of the arm rest. Thus, the present invention can define the limit of rear movement with a simple construction.

Preferably, the base section is vertically pivotably supported on the console body, and the vehicle center console further has a third opening mode for opening the opening of the console body by sliding the small item receptacle further rearwardly from the second opening mode and thereby pivotally moving the base section and the slide section to a stand-up position such that the opening of the console body is further opened. With this arrangement, the storage section provided beneath the small item receptacle and the slide section can be opened largely from the closed state. Namely, the opening of the console body can be opened largely so that large baggage can be stored into the storage section of the console body without the small item receptacle being removed from the console body.

Preferably, a front end portion of the base section which the small item receptacle contacts during rearward sliding movement of the small item receptacle has a quarter-circular shape projecting forwardly and downwardly as the console body is viewed in side elevation. Thus, the arm rest can be readily pivotally moved to the stand-up position due to rearward sliding force of the small item receptacle.

Further, preferably, the console body has a groove formed in a side surface section thereof for guiding therealong the small item receptacle, the small item receptacle including a contact member normally biased into contact with a bottom of the groove. The groove comprises first to third groove portions, the first groove portion extending substantially horizontally in a front-to-rear direction, the second groove portion extending rearwardly continuously from the rear end of the first groove portion in an ascending or descending slope, the third groove portion extending in a rear-to-front direction in a slope of an opposite direction from the slope of the second groove portion so as to connect between the rear end of the second groove portion and the first groove portion, a first stepped portion being formed at a boundary between the first groove portion and the second groove portion by the second groove portion having a bottom formed deeper than a bottom of the first groove portion, a second stepped portion being formed at a boundary between the second groove portion and the third groove portion by the third groove portion having a bottom formed deeper than the bottom of the second groove portion, a third stepped portion being formed at a boundary between the third groove portion and the first groove portion by the bottom of the first groove portion being formed deeper than the bottom of the third groove portion.

The groove formed in the side surface section of the console body for guiding therealong the small item receptacle comprises the first, second and third groove portions with the first, second and third stepped portions formed at the boundaries between the groove portions. The small item receptacle includes the contact member that is normally biased into contact with the bottom of the groove. When a passenger attempts to move the small item receptacle across any one of the boundaries, the contact member is prevented from crossing the boundary by contacting the stepped portion. Namely, with the stepped portions and the contact member, the present invention allows the small item receptacle to slide along the groove only in a predetermined direction.

More specifically, when the small item receptacle is slid from the closed state to the second opening mode, the contact member contacts the first stepped portion so that the small item receptacle is prevented from sliding forward. Thus, even if the passenger releases its hand from the small item receptacle and the arm rest, the small item receptacle would not slide back forwardly, and thus, the passenger can store baggage into the storage section of the console body. The passenger may sometimes slide the small item receptacle further rearwardly from the above-mentioned state until the aforementioned state shifts to the third opening mode and then return the small item receptacle to the closed state, during which time the contact member is prevented by the second stepped portion from returning to the second groove portion. In this way, the opening of the console body can be closed from the third opening mode to the closed state smoothly with no halfway stop.

Thus, with the stepped portions and the contact member, the present invention can control the sliding direction of the small item receptacle by mere adjustment in depth of the groove. Namely, the present invention can properly control the sliding direction of the small item receptacle with a small number of component parts, which is very advantageous.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which:

FIG. 1 is a perspective view of a vehicle employing an embodiment of a vehicle center console of the present invention;

FIG. 2 is a perspective view of the vehicle center console shown in FIG. 1;

FIG. 3 is an exploded perspective view of an arm rest and beam sections shown in FIG. 2;

FIG. 4 is a sectional view taken along the 4-4 line of FIG. 2;

Figure 10:
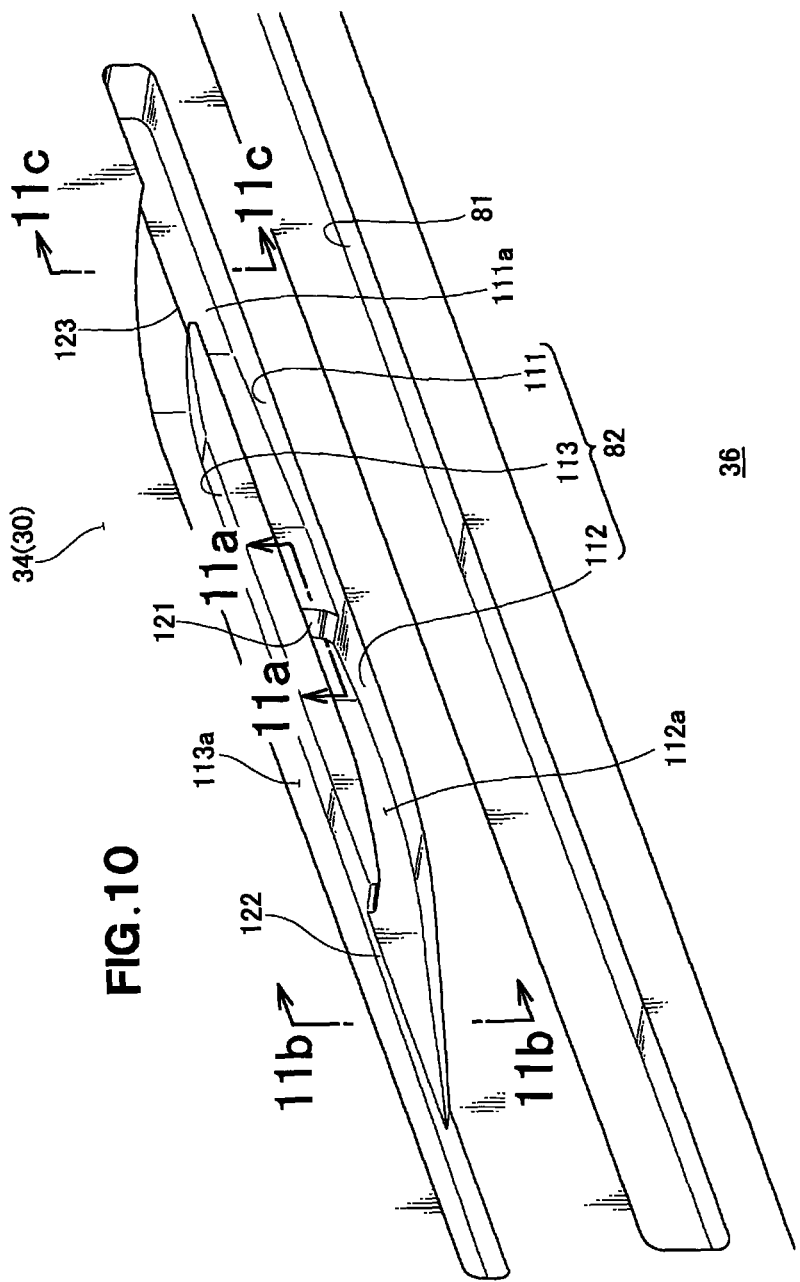
FIG. 10 is a perspective view explanatory of grooves formed in each of the beam sections shown in FIG. 7.
Figure 11:
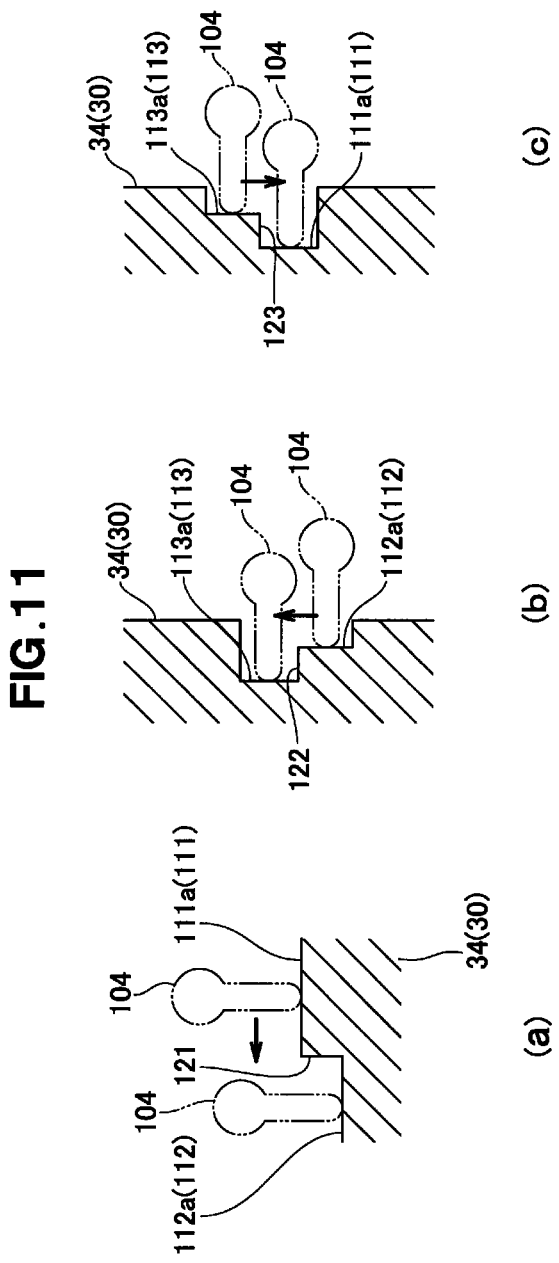
Figure 12:
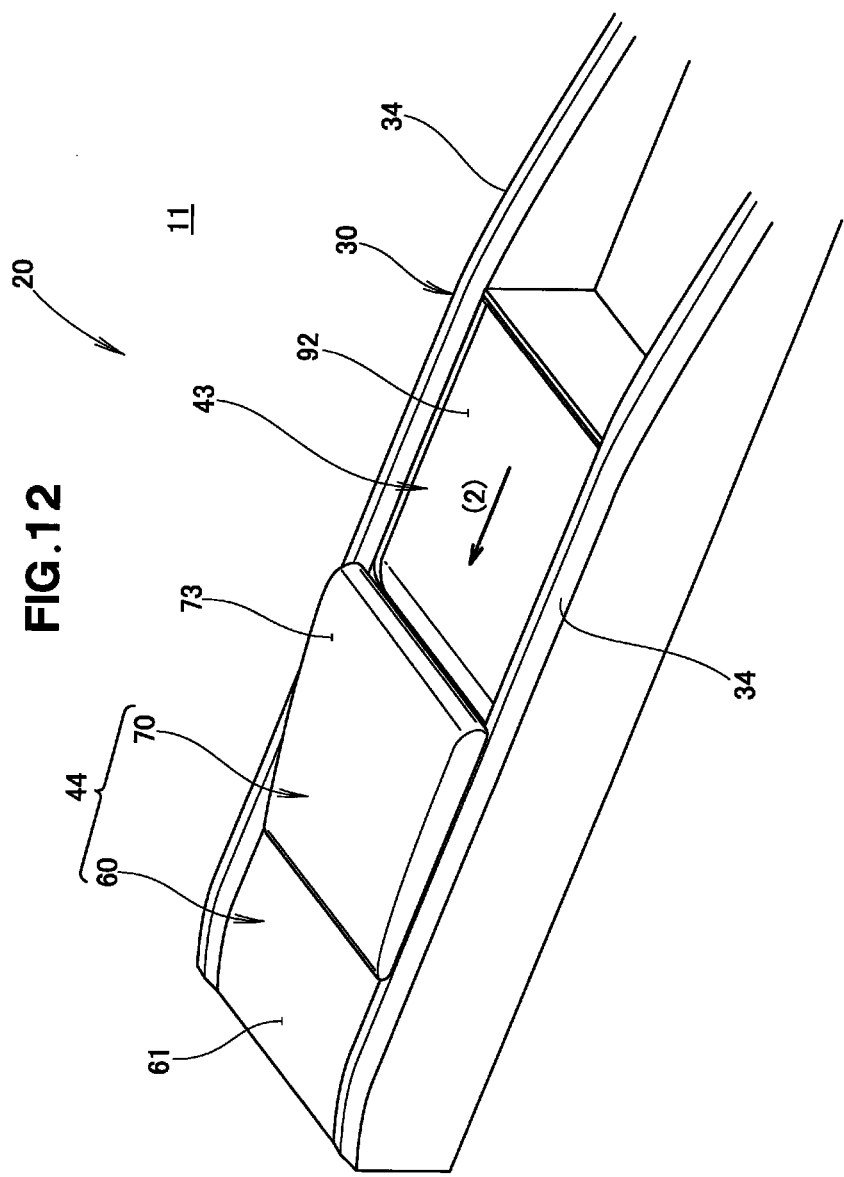
Figure 13:
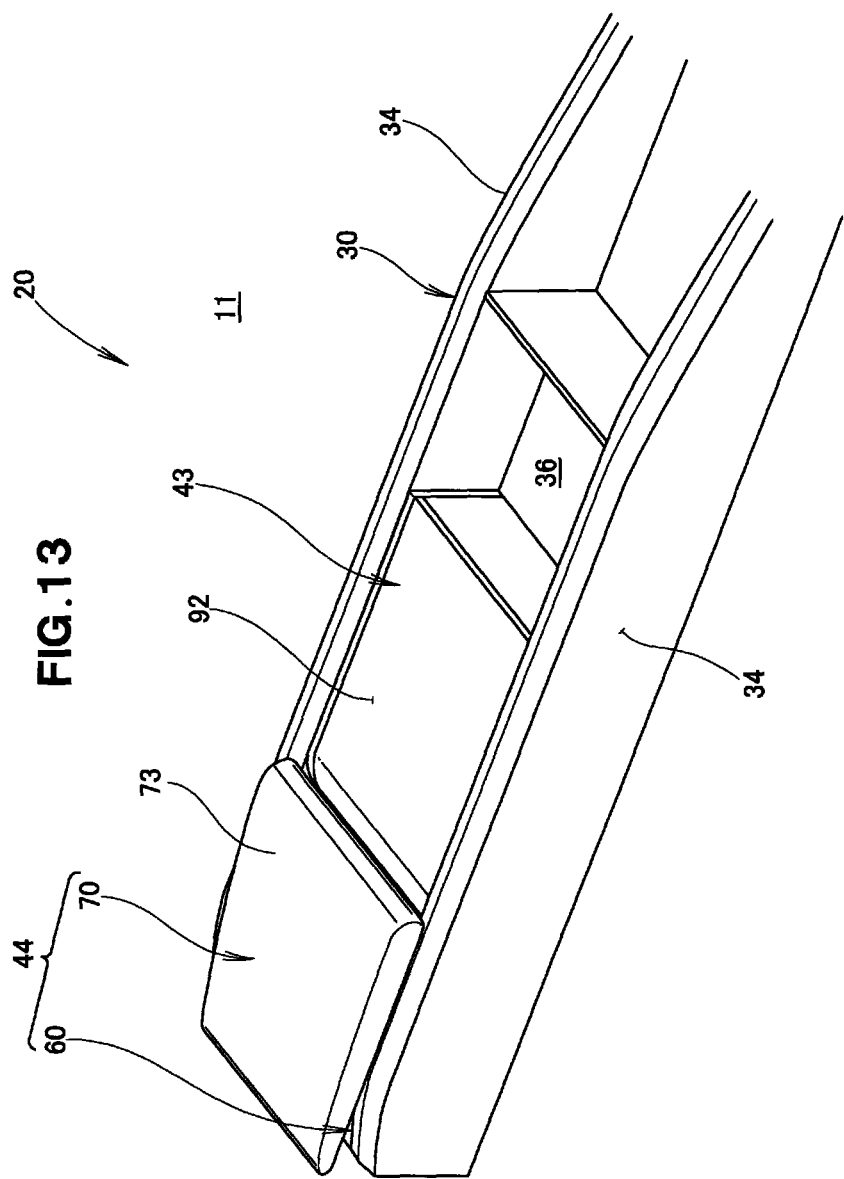

(a), (b) and (c) of FIG. 11 are sectional views taken along the 11a-11a line, 11b-11b line and 11c-11c line, respectively, of FIG. 10;

FIG. 12 is a perspective view explanatory of the closed state of the vehicle center console shown in FIG. 2;

FIG. 13 is a perspective view explanatory of a second opening mode of the vehicle center console shown in FIG. 2; and FIG. 14 is a perspective view explanatory of a third opening mode of the vehicle center console shown in FIG. 2.

DETAILED DESCRIPTION OF THE INVENTION

In the following description, the terms "left", "right", "front", "rear", etc. are used to refer to directions as viewed in a traveling direction of a vehicle.

FIG. 1 is a perspective view of the vehicle 10 employing an embodiment of a vehicle center console 20 of the present invention. As shown in FIG. 1, an instrument panel 12 is provided in a front portion of a passenger compartment 11 of the vehicle 10 and extends in a vehicle width direction, the vehicle center console 20 (hereinafter referred to simply as "console 20") extends rearwardly (i.e., in a rearward direction of the vehicle) from a widthwise middle part of the instrument panel 12, and left and right seats 14 and 15 for seating passengers are provided with the console 20 interposed therebetween. The console 20 is mounted on a floor panel 16 of the passenger compartment 11.

A steering wheel 17 for steering the vehicle 10 is mounted on a left end portion of the instrument panel 12. The driver's seat 14 is disposed behind the steering wheel 17, and the front passenger's seat 15 is disposed to the right of the driver's seat 14 with the console 20 interposed therebetween. A door 18 disposed outwardly of the seat 14 is pivotably mounted on the vehicle body.

FIG. 2 shows details of the console 20. As shown in FIG. 2, the console 20 has a console body 30 mounted on the floor panel 16, and the console body 30 is open upwardly and laterally (i.e., has upward and lateral openings) and capable of storing passenger's baggage. A plurality of utility parts 41 to 44 usable by the passenger are provided to cover the upward opening of the console body 30.

The console body 30 includes: a console base section 31 mounted on the floor panel 16; left and right support frames 32 extending upward from front left and right side portions of the console base section 31; a duct 33 extending upward from the rear end of the console base section 31; and left and right beam sections 34 extending from left and right sides of the upper end of the duct 33 to respective intermediate portions, in a height direction, of the left and right support frames 32.

An area surrounded by the console base section 31, left and right support frames 32, duct 33, left and right beam section 34 is a baggage storage section 36 capable of storing passenger's baggage. Baggage can be stored into the baggage storage section 36 through the upper or lateral opening of the console body 30. A way to store baggage through the upward opening into the console body 30 will be described later.

The utility parts 41 to 44 are disposed between the left and right beam sections 34, and these utility parts 41 to 44 are, front to rear, tray 41 capable of placing thereon small items, drink holder 42 capable of holding thereon a beverage container, small item receptacle 43 capable of storing therein small items and arm rest 44 capable of placing thereon a passenger's arm.

A palm rest 51 capable of placing thereon a passenger's wrist is provided between the upper ends of the left and right support frames 32, and a monitor 52 is provided in front of the palm rest 51. A shift knob 53 is provided on a left end portion of the palm rest 51.

Details of the arm rest 44 will now be described with reference to FIGS. 3 and 4. As shown in FIGS. 3 and 4, the arm rest 44 comprises a swing section 60 (i.e., base section) pivotably supported on respective rear portions of the left and right beam sections 34, and a slide section 70 having a front end portion capable of contacting the small item receptacle 43 and mounted on the swing section 60 for sliding movement along the swing section 60 in the front-rear direction. These swing section 60 and slide section 70 are substantially equal in length in the front-rear direction.

The swing section 60 includes: a box-shaped swing section body 61 opening forwardly; pin-shaped rotation shafts 62 projecting from opposite side surface sections 61b of the swing section body 61 toward the left and right beam section 34; left and right slide rails 63 provided on the opposed inner side surfaces of the swing section body 61 and extending in the front-rear direction; and left and right front stoppers 64 provided at the respective front ends of the slide rails 63. A front end region of an upper surface portion of the swing section body 61 is recessed rearwardly in a substantially U shape to form a recess-shaped portion 61d. Further, left and right front end portions 61a of the swing section body 61 are each a portion which the small item receptacle 43 of FIG. 2 contacts during rearward sliding movement of the small item receptacle 43, and the front end portion 61a has a quarter-circular shape projecting forwardly and downwardly.

The rotation shafts 62 are fitted in rotation-shaft fitting holes 34a, formed in respective rear end portions of the left and right beam sections 34, in such a manner that the swing section 60 is vertically pivotable about the rotation shafts 62. Thus, the swing section 60 is supported for vertical pivoting movement about rear end portions of the left and right beam sections 34 (console body 30).

The slide section 70 includes a substantially-L-shaped slide section body 71 extending in the front-rear direction and having an upwardly-projecting front end portion; a plate-shaped member 72 fixed to an upper end portion of the slide section body 71; a cushion 73 mounted on the upper surface of the plate-shaped member 72 and capable of placing thereon an elbow of the passenger; and left and right arm rest sliders 74 fixed on side surface portions 71b of the slide section body 71 and slidable on and long the slide rails 63 (only the right arm rest slider 74 is shown in FIG. 3).

A limit of forward movement of the slide section 70 is defined by the arm rest sliders 74 contacting the above-mentioned front stoppers 64. A limit of rearward movement of the slide section 70 will be detailed later.

With the swing section 60 closing a portion of the upward opening of the console body 30, a distal end portion 60b of the swing section 60 is located forward of a proximal end portion 60a of the swing section 60, as shown particularly in FIG. 4. Further, with the slide section 70 closing another portion of the upward opening of the console body 30, the slide section 70 is located forward of the distal end portion 60b of the swing section 60. The slide section 70 is slidable rearwardly toward the proximal end portion 60a of the swing section 60.

The front end of the cushion 73 (i.e., the front end of the slide section 70) overlaps the upper surface of the rear end of the small item receptacle 43. Thus, the slide section 70 in its closed state can prevent the baggage storage section 36 from being exposed between the arm rest 44 and the small item receptacle 36, which can thereby enhance outer appearance of the center console 20. Further, such arrangements can secure a larger opening and allow larger baggage to be stored in the baggage storage section 36 than in a case where a partition wall is provided between the arm rest 44 and the small item receptacle 36.

Next, operation of the instant embodiment of the vehicle center console when the passenger stores baggage into the baggage storage section 36 will be described with reference to FIGS. 5 and 6.

Figure 5A:
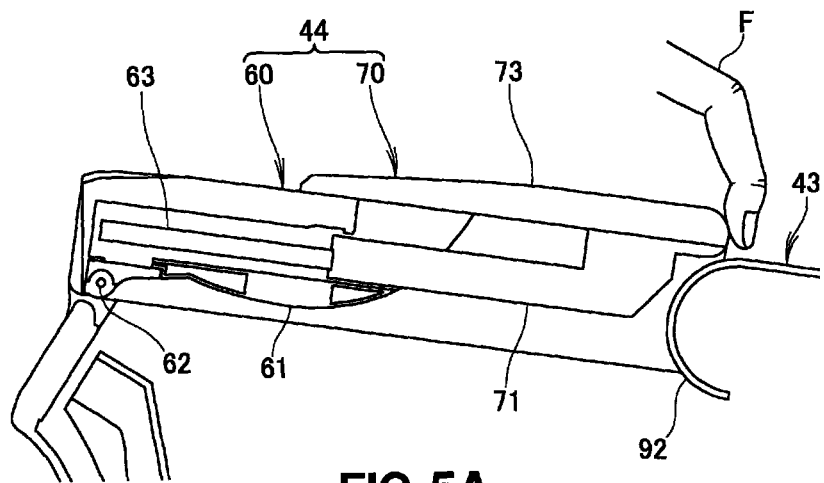
FIGS. 5A and 5B are views explanatory of operation from a closed state to a first opening mode of the vehicle center console of FIG. 2.
Figure 5B:
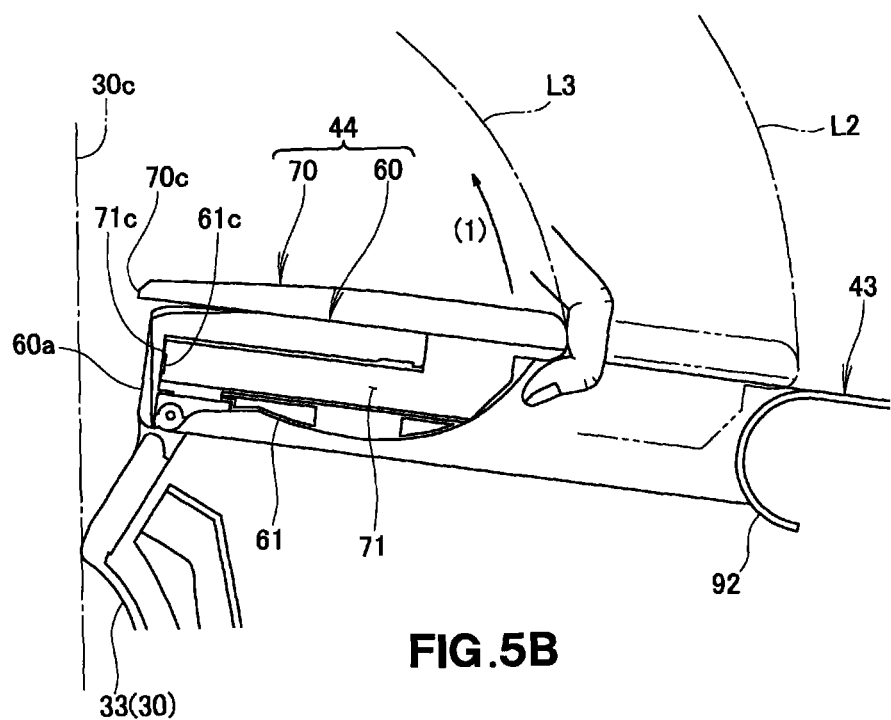
Figure 6:
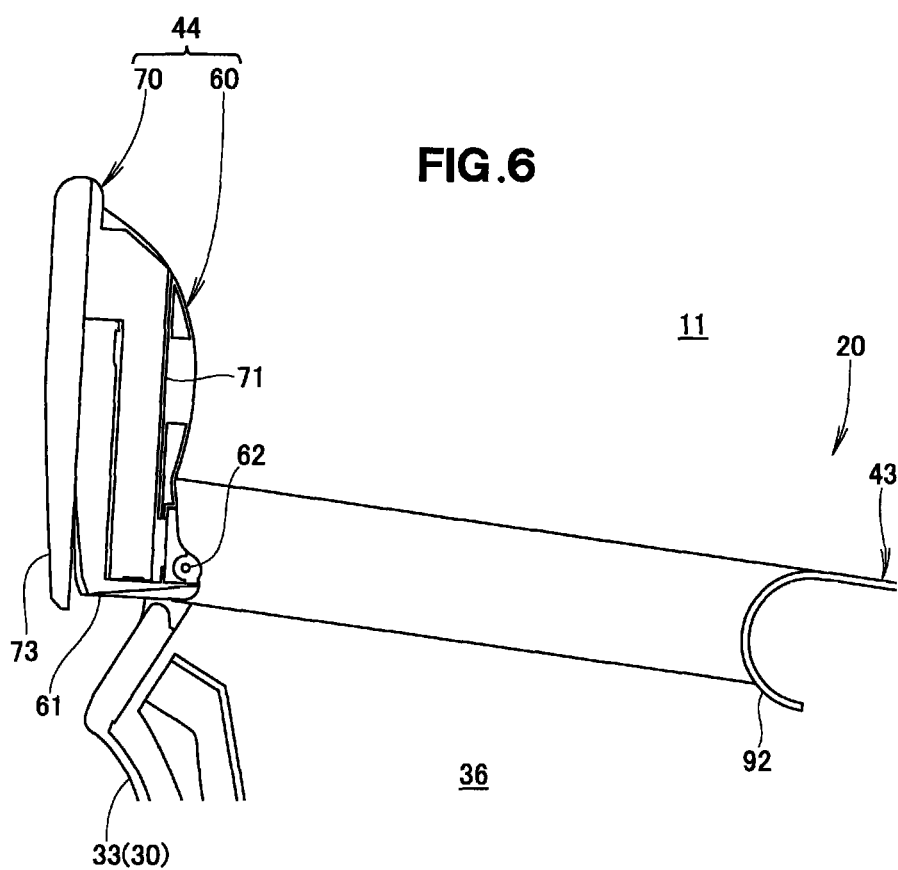
FIG. 6 is a view explanatory of a further opening mode of the first opening mode shown in FIG. 5.

As shown in FIG. 5A, the passenger slides the slide section 70 rearwardly by engaging its finger F with the front end of the cushion 73 and pulling the cushion 73 rearwardly. As shown in FIG. 5B, as the passenger slides the slide section 70 to a limit of rear movement (i.e., rear movement limit), a rear end portion 71c of the slide section body 71 is brought into contact with the inner surface of a rear surface portion 61c of the swing section body 61; in this manner, the rear movement limit is defined. By such rearward sliding movement of the slide section 70, the upward opening of the console body 30 is opened. This mode of operation will hereinafter be referred to as "first opening mode".

With the slide section 70 slid or moved rearwardly to the rear movement limit as above, the front end of the slide section 70 aligns vertically with the front end of the swing section 60, and the rear end of the slide section 70 aligns vertically with the rear end of the swing section 60. Namely, respective lengths, in the front-rear direction, of the swing section 60 and the slide section 70 are set substantially equal to each other in such a manner that their front ends and rear ends align vertically with each other, as a result of which a length of the arm rest 44 when the slide section 70 has been slid or moved to the rear movement limit can be minimized.

With the slide section 70 slid or moved rearwardly to the rear movement limit, the rear end 71c of the slide section 70 is located forwardly of the rear end 30c (depicted by imaginary line 30c in FIG. 5B) of the console body 30. Namely, the length, in the front-rear direction, of the slide section 70 is set such that, with the slide section 70 slid from the position closing the upward opening toward the proximal end portion 60a, i.e. to the rear movement limit, the rear end 70c of the slide section 70 is located forwardly of the rear end 30c of the console body 30.

The rear end 70c of the slide section 70 can be prevented from projecting toward a rear seat when the slide section 70 has been slid to the rear movement limit. This arrangement can prevent the slide section 70 from giving an oppressive feeling to a passenger in the rear seat and thereby keep comfortable a space within the passenger compartment.

If baggage to be stored is small in size, it can be stored into the baggage storage section 36 through an opening between the front end of the slide section 70 and the rear end of the small item receptacle 43. If baggage to be stored is large in size, on the other hand, the swing section 60 is pivoted rearwardly and upwardly as shown in arrow (1). At that time, the swing section 60 is pivoted with the slide section body 71 accommodated in the swing section body 61.

When the slide section 70 is not slid rearwardly, a pivoting trajectory of the arm rest 44 is large as indicated by imaginary line L2. When the slide section 70 has a reduced length by being slid rearwardly, on the other hand, the pivoting trajectory of the arm rest 44 is small as indicated by imaginary line L3; thus, a necessary amount of movement of the passenger's hand can be reduced, which can thereby achieve an enhanced operability.

The passenger pivots the swing section 60 until the arm rest 44 takes a stand-up position. Thus, large baggage can be stored into the baggage storage section 36. Such a mode of operation will be referred to as "further opening mode of the first opening mode".

Figure 7:
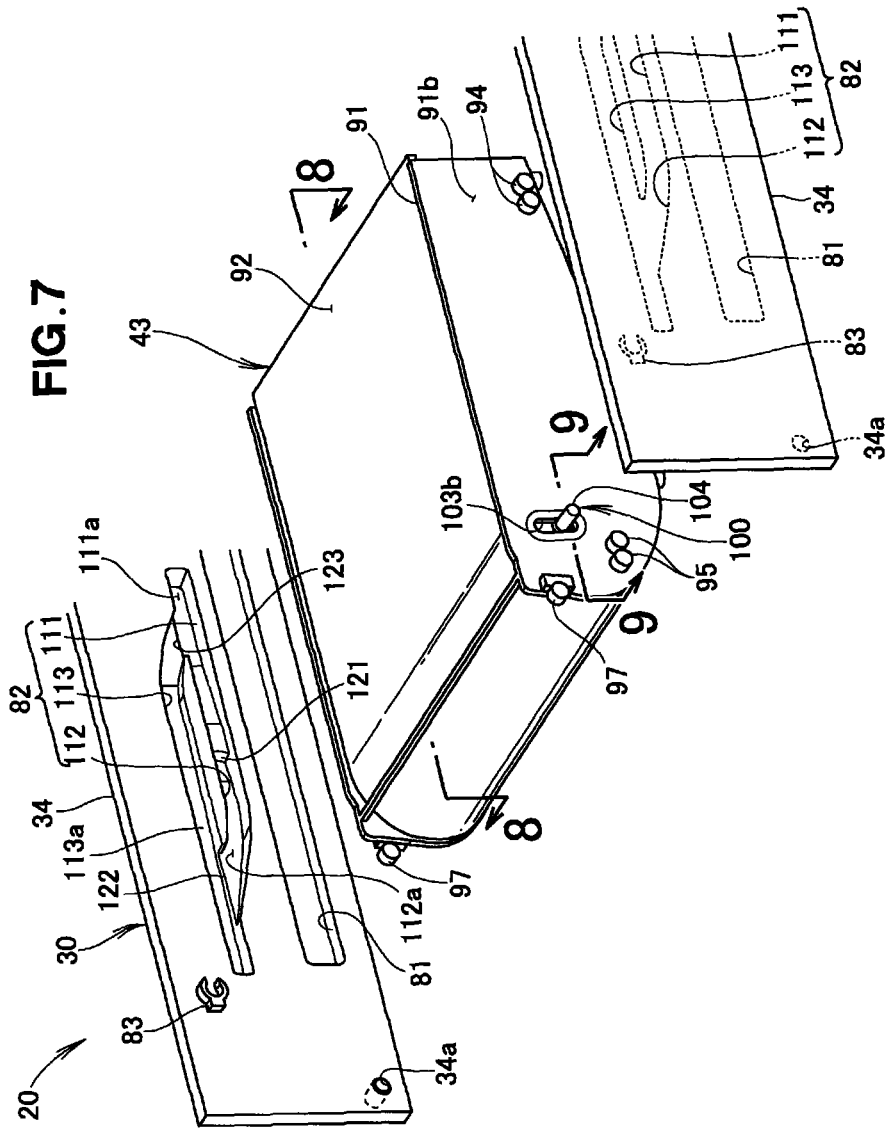
FIG. 7 is an exploded perspective view of the small item receptacle and the beam sections shown in FIG. 2.
Figure 8:
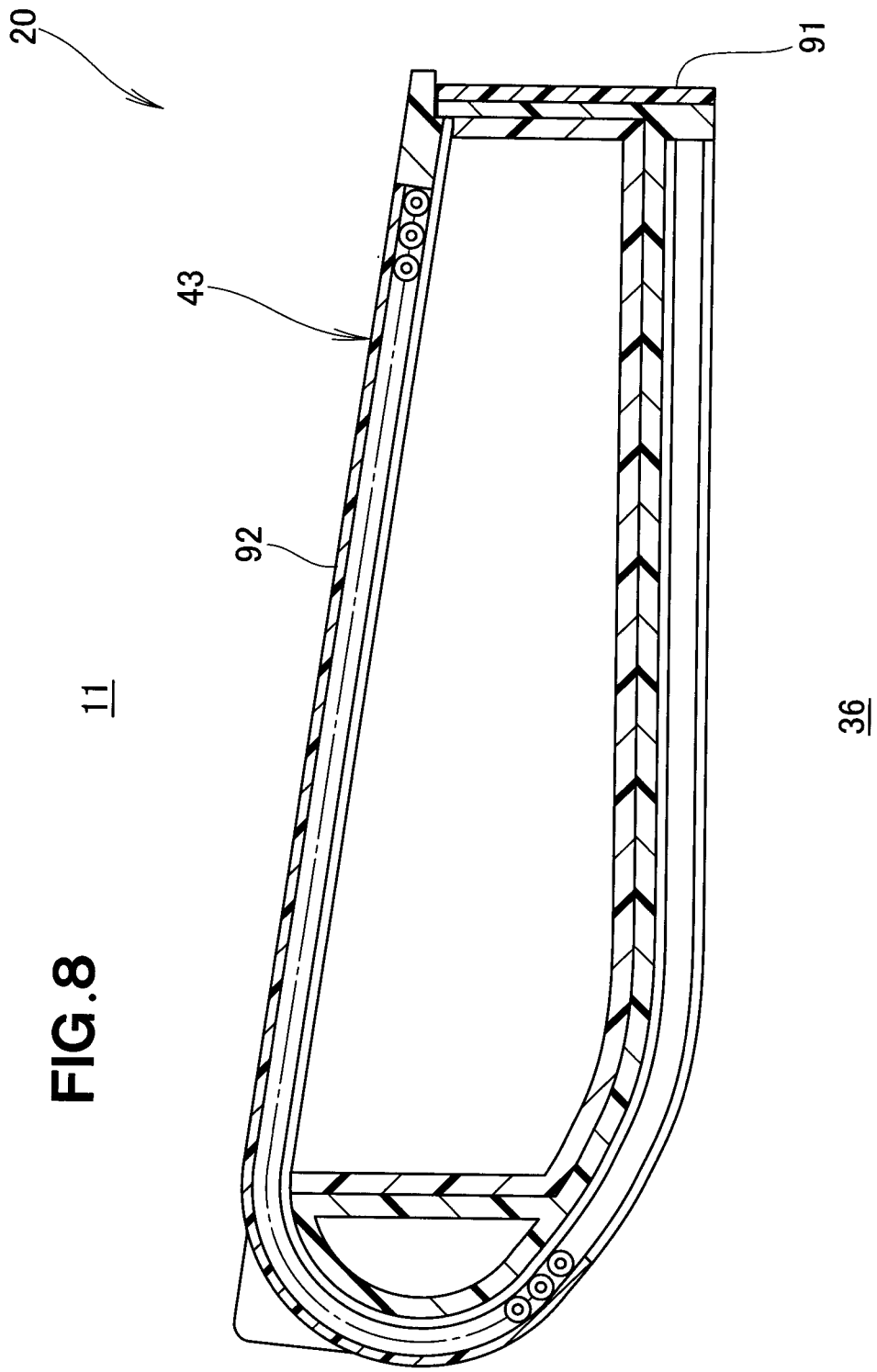
FIG. 8 is a sectional view taken along the 8-8 line of FIG. 7.

Now, the small item receptacle 43 will be detailed with reference to FIGS. 7 and 8. As shown in FIGS. 7 and 8, the small item receptacle 43 is supported by support grooves 81 formed in lower portions of the left and right beam sections 34 in such a manner that it can slide in the front-rear direction. Grooves 82 for guiding therealong the sliding movement of the small item receptacle 43 are formed in the left and right beam sections 34 above the support grooves 81. Fitting concave portions 83 into which rear ends of the small item receptacle 43 slid to the rear movement limit are fittable are provided on the left and right beam sections 34 above the rear ends of the grooves 82.

The small item receptacle 43 includes a tray-shaped small item receptacle body 91 opening upwardly and thereby capable of storing therein small items, and a cover 92 slidably mounted on the body 91 for opening/closing the upward opening of the body 91.

Side surface sections 91b of the small item receptacle body 91 each have a rear end lower portion having a semi-circular shape that projects rearwardly and downwardly. Each of the side surface sections 91b has sliders 94 and 95 provided on front and rear portions thereof for front-rear sliding movement in and along the corresponding support groove 81. Further, a contact mechanism 100 is provided on each of the side surface sections 91b and normally biased into contact with the bottom surface of the corresponding groove 82.

Figure 9:
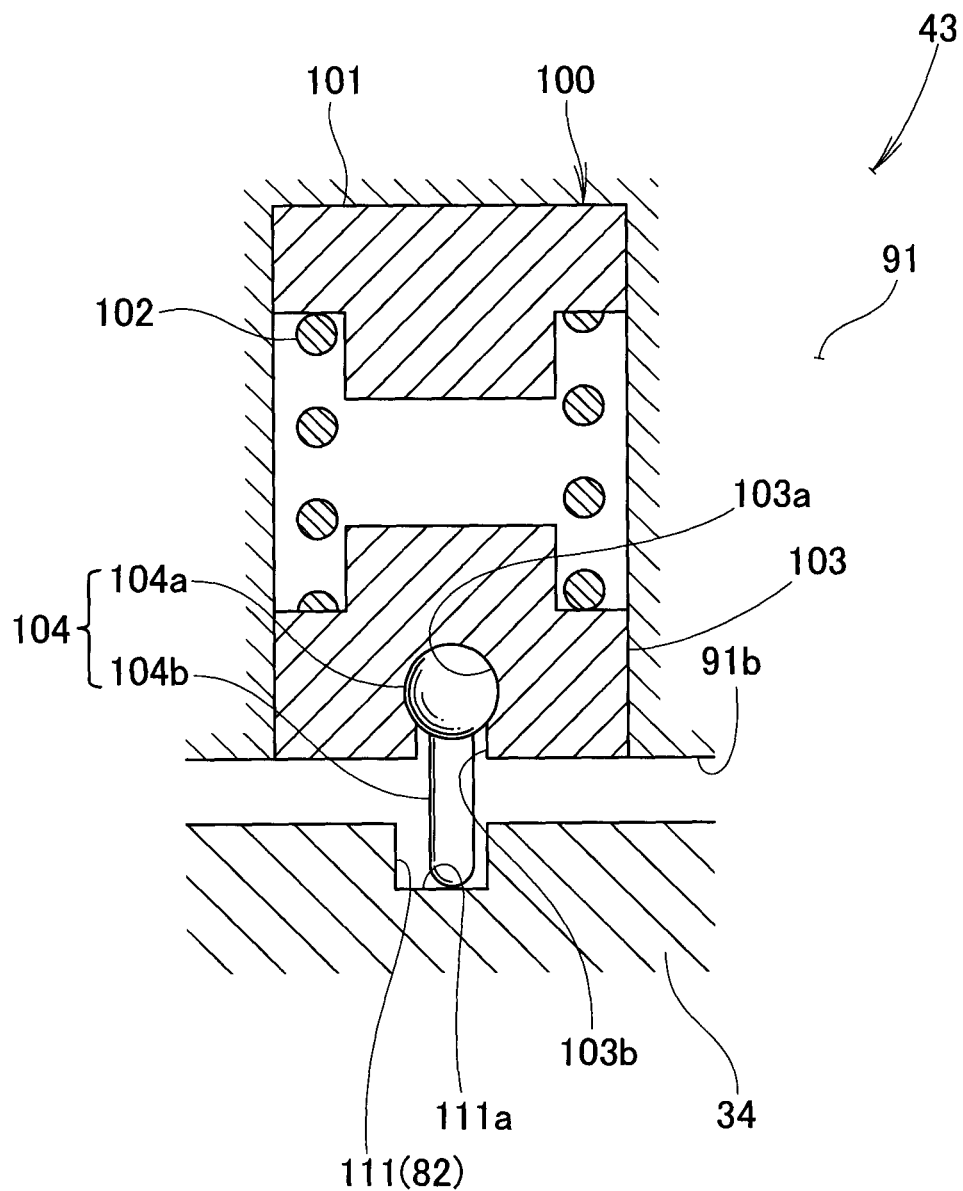
FIG. 9 is a sectional view taken along the 9-9 line of FIG. 7.

The contact mechanism 100 will be detailed below with reference to FIG. 9 that is a sectional view taken along the 9-9 line of FIG. 7. As shown in FIG. 9, the contact mechanism 100 includes: a fixed member 101 fixed to the small item receptacle body 91; a spring 102 engaged at one end by the fixed member 101; a biased member 103 normally biased by the spring 102, engaged at the other end with the biased member 103, toward the corresponding beam section 34; and a contact member 104 having a contact base portion 104a accommodated in the biased member 103, and a distal end portion 104b exposed out of the biased member 103 and held in contact with the bottom surface of the groove 82.

The contact member 104 includes the base portion 104a of a spherical shape, and the distal end portion 104b of a round bar shape formed integrally with the contact base portion 104a. The biased member 103 has a contact member accommodating portion 103a having the contact base portion 104a accommodated therein, and a vertically elongated elliptical hole 103b through which the contact distal end portion 104b extends transversely. Because the hole 103b of the biased member 103 has a vertically elongated elliptical shape, the contact distal end portion 104b is movable in a vertical (up-down) direction (i.e., in a direction perpendicular to the sheet of the figure). However, the contact distal end portion 104b is movable very slightly in the front-rear direction.

The following describe details of the groove 82 with reference to FIGS. 10 and 11. As shown in FIG. 10, the groove 82 comprises first to three groove portions 111 to 113 communicating with one another. The first groove portion 111 is formed to extend substantially horizontally in the front-rear direction and has a bottom 111a gradually becoming shallower in the front-to-rear direction. The second groove portion 112 is formed to extend rearwardly, continuously from the rear end of the first groove portion 111, in an ascending slope and has a bottom 112a gradually becoming shallower in the front-to-rear direction. The third groove portion 113 is formed to extend in a rear-to-front descending slope so as to connect between the rear end of the second groove portion 112 and the first groove portion 111. The slope of the third groove portion 113 is of an opposite direction from the slope of the second groove portion 112. In addition, the third groove portion 113 has a bottom 113a gradually becoming shallower in the rear-to-front direction.

At a boundary between the first groove portion 11 and the second groove portion 112, as shown in (a) of FIG. 11, the bottom 112a of the second groove portion 112 has a greater depth (i.e., formed deeper) than the bottom 111a of the first groove portion 111. Thus, a first stepped portion 121 is formed at the boundary between the first groove portion 111 and the second groove portion 112.

Further, at a boundary between the second groove portion 112 and the third groove portion 113, as shown in (b) of FIG. 11, the bottom 113a of the third groove portion 113 has a greater depth (i.e., formed deeper) than the bottom 112a of the second groove portion 112. Thus, a second stepped portion 122 is formed at the boundary between the second groove portion 112 and the third groove portion 113.

Furthermore, at a boundary between the third groove portion 113 and the first groove portion 111, as shown in (c) of FIG. 11, the bottom 111a of the first groove portion 111 has a greater depth (i.e., formed deeper) than the bottom 113a of the third groove portion 113. Thus, a third stepped portion 123 is formed at the boundary between the third groove portion 113 and the first groove portion 111.

Next, operation of the instant embodiment of the vehicle center console 20 when the small item receptacle 43 supported by such grooves 82 is slid will be described with reference to FIGS. 12 to 14. As shown in FIG. 12, a part of the upward opening of the console body 30 is normally closed by the arm rest 44, and the remaining part of the upward opening of the console body 30 is normally closed by the small item receptacle 43; such a state is referred to as "closed state". When baggage is to be stored into a portion of the storage section of the console body 30 beneath the small item receptacle 43, the passenger places the vehicle center console 20 in a second opening mode. More specifically, the passenger slides the small item receptacle 43 rearwardly as indicated by arrow (2).

As the small item receptacle 43 is slid by the passenger rearwardly from the closed state as above, the slide section 70 of the arm rest 44 too is moved rearwardly by being pushed at a front end portion by the small item receptacle 43, as shown in FIG. 13. By the slide section 70 being moved rearwardly to the rear movement limit, the vehicle center console 20 is placed in the second opening mode.

The arm rest 44 and the small item receptacle 43 are mounted adjacent to each other and in a slidable fashion. Thus, in the second opening mode, the arm rest 44 too can be slid rearwardly as the small item receptacle 43 is slid rearwardly. Because both the small item receptacle 43 and the arm rest 44 can be slid with a single operation, the instant embodiment can even further enhance the operability.

Further, because the rear movement limit of the slide section 70 is defined by the swing section 60, the rear movement limit can be defined with a simple construction.

As the small item receptacle 43 is slid forwardly after it was slid to the second opening mode from the closed state, the contact member 104 contacts the first stepped portion 121 as seen in (a) of FIG. 11, so that the small item receptacle 43 can be prevented from being slid further forward. Thus, even if the passenger releases its hand from the small item receptacle 43 and the arm rest 44, the small item receptacle 43 would not slide forward beyond the first stepped portion 121, and thus, the passenger can store baggage into the portion of the storage section of the console body 30 with its hand released from the small item receptacle 43 and the arm rest 44.

By the small item receptacle 43 being slid further rearward from the second opening mode, the arm rest 44 pivots to the standup position, as shown in FIG. 14. This mode of operation will be referred to as "third opening mode", in which fitting projections 97 provided on the left and right side surface sections 91b are kept in fitting engagement with the corresponding fitting concave portions 83, as also seen in FIG. 7. Thus, even if the passenger releases its hand from the small item receptacle 43, the arm rest 44 can be kept in the standup position and would not slide forward.

As seen in FIGS. 14 and 12, the storage section provided beneath the small item receptacle 43 and the slide section 70 can be opened largely from the closed state. Namely, the upward opening of the console body 30 can be opened largely so that large baggage can be stored into the storage section of the console body 30 without the small item receptacle being removed from the console body 30.

Further, as described above in relation to FIG. 3, the front end portion 61a which the small item receptacle 43 contacts during the rearward sliding movement has a quarter-circular shape projecting forwardly and downwardly as viewed in side elevation. Thus, the arm rest 44 can be readily pivotally moved to the stand-up position by the front end portion 61a of the swing section 60 riding on a rear end portion of the small item receptacle 43 due to rearward sliding force of the receptacle 43.

Referring to FIG. 4 as well as FIGS. 10 and 11, the small item receptacle 43 can be slid forwardly in order to return the center console 20 from the third opening mode to the closed state, during which time the contact member 104 is prevented by the second stepped portion 122 from returning to the second groove portion 112. In this way, the contact member 104 can be returned to the first groove portion 111 by being guided by the third groove portion 113. The upward opening of the console body 30 can be closed from the third opening mode to the closed state smoothly with no halfway stop.

In the instant embodiment, as set forth above, the sliding direction of the small item receptacle 43 can be controlled properly by mere adjustment in depth of the groove 82. Namely, the sliding direction of the small item receptacle 43 can be controlled with a small number of component parts, which is very advantageous.

As set forth above in relation to FIGS. 5 and 13, the instant embodiment has a plurality of modes for opening the opening of the console body 30, i.e. the first opening mode for opening the opening of the console body 30 by sliding the arm rest 44 rearwardly (see FIG. 5B), and the second opening mode for opening the opening of the console body 30 by sliding the small item receptacle 43 further rearwardly to thereby slide the small item receptacle 43 and the arm rest 44 rearwardly together in a tandem fashion (see FIG. 13). When baggage is to be stored into the storage portion beneath the arm rest 44 in the closed state, only the arm rest 44 is slid in the first opening mode, and then, after storage of the baggage beneath the arm rest 44, the arm rest 44 is slid back forwardly to close the opening of the console body 30. When baggage is to be stored into the storage portion beneath the small item receptacle 43 in the closed state, on the other hand, the small item receptacle 43 and the arm rest 44 are slid rearwardly together in the second opening mode, and, after storage of the baggage beneath the small item receptacle 43, the small item receptacle 43 and the arm rest 44 are slid back forwardly to close the opening of the console body 30. Namely, because baggage can be stored beneath both the small item receptacle 43 and the arm rest 44, an increased number of pieces of baggage can be readily stored in a lower portion (storage section 36) of the console body 30. Further, because the opening of the console 30 is closed after storage of the baggage, small items stored in the receptacle 43 can be prevented from falling down into the console body 30. As a result, the center console 20 can reliably prevent small items from falling down into the console body 30 while being capable of storing an increased number of pieces of baggage.

Whereas the vehicle center console of the present invention has been described above in relation to the case where the console body is open upwardly and laterally (i.e., has the upward and lateral openings), the basic principles of the present invention are also applicable to a case where the console body is of a box shape opening only upwardly. However, if the lateral opening is formed to extend over a relatively long distance from beneath the small item receptacle to beneath the armrest, it would be more useful because relatively large baggage can be readily stored into the console body without the small item receptacle and the armrest being slid.

In addition, whereas each of the front end portions 61a of the swing section 60, which the small item receptacle 43 contacts during the rearward sliding movement, has been shown and described as being of a quarter-circular shape projecting forwardly and downwardly as the console body 30 is viewed in side elevation, the present invention is not so limited as long as the front end portion 61a has a shape capable of riding on the small item receptacle 43, such as a shape having a gentle slanting surface.

The vehicle center console of the present invention is well suited for application to passenger automobiles.

What is claimed is:

1. A vehicle center console comprising:
   a console body disposed between left and right seats of a vehicle, the console body having an upward opening and capable of storing therein baggage;

a small item receptacle closing a part of the opening of the console body and capable of storing therein a small item; and an arm rest closing a remaining part of the opening of the console body and capable of placing thereon an elbow of a passenger, the arm rest being disposed rearwardly of the small item receptacle, the small item receptacle and the arm rest being mounted adjacent to each other on the console body in such a manner that the small item receptacle and the arm rest are slidable in a front-rear direction, for opening the opening of the console body, the vehicle center console having:
  a first opening mode for opening the opening of the console body by sliding the arm rest rearwardly; and
  a second opening mode for opening the opening of the console body by sliding the small item receptacle rearwardly to thereby slide both the small item receptacle and the arm rest together rearwardly.

2. The vehicle center console according to claim 1, wherein the arm rest includes a base section mounted on the console body, and a slide section slidably mounted on the base section and having a front end portion capable of contacting the small item receptacle,
  the slide section is slid rearwardly by the small item receptacle being slid rearwardly, and
  a limit of rearward movement of the slide section is defined by the base section of the arm rest.

3. The vehicle center console according to claim 2, wherein the base section is vertically pivotably supported on the console body, and which further has a third opening mode for opening the opening of the console body by sliding the small item receptacle further rearwardly from the second opening mode and thereby pivotally moving the base section and the slide section to a stand-up position such that the opening of the console body is further opened.

4. The vehicle center console according to claim 3, wherein a front end portion of the base section which the small item receptacle contacts during rearward sliding moment of the small item receptacle has a quarter-circular shape projecting forwardly and downwardly as the console body is viewed in side elevation.

5. The vehicle center console according to claim 3, wherein the console body has a groove formed in a side surface section thereof for guiding therealong the small item receptacle, the small item receptacle including a contact member normally biased into contact with a bottom of the groove,
  the groove comprising first to third groove portions,
    the first groove portion extending substantially horizontally in a front-to-rear direction,
    the second groove portion extending rearwardly continuously from the rear end of the first groove portion in an ascending or descending slope,
    the third groove portion extending in a rear-to-front direction in a slope of an opposite direction from the slope of the second groove portion so as to connect between the rear end of the second groove portion and the first groove portion,
  a first stepped portion being formed at a boundary between the first groove portion and the second groove portion by the second groove portion having a bottom formed deeper than a bottom of the first groove portion,
  a second stepped portion being formed at a boundary between the second groove portion and the third groove portion by the third groove portion having a bottom formed deeper than the bottom of the second groove portion,
  a third stepped portion being formed at a boundary between the third groove portion and the first groove portion by the bottom of the first groove portion being formed deeper than the bottom of the third groove portion.

\* \* \* \* \*